US008108708B2

(12) United States Patent
Phoenix et al.

(10) Patent No.: US 8,108,708 B2
(45) Date of Patent: Jan. 31, 2012

(54) POWER OPTIMIZATION WHEN USING EXTERNAL CLOCK SOURCES

(75) Inventors: Tim Phoenix, Pepperell, MA (US); Igor Wojewoda, Tempe, AZ (US); Pavan Kumar Bandarupalli, Andhra Pradesh (IN)

(73) Assignee: Microchip Technology Incorporated, Chandler, AZ (US)

( * ) Notice: Subject to any disclaimer, the term of this patent is extended or adjusted under 35 U.S.C. 154(b) by 719 days.

(21) Appl. No.: 11/865,148

(22) Filed: Oct. 1, 2007

(65) Prior Publication Data

US 2008/0276115 A1    Nov. 6, 2008

Related U.S. Application Data

(60) Provisional application No. 60/915,713, filed on May 3, 2007.

(51) Int. Cl.
*G06F 1/08* (2006.01)

(52) U.S. Cl. ........ 713/501; 713/300; 713/320; 713/322; 713/500; 712/37

(58) Field of Classification Search .................. 713/300, 713/320, 322, 500, 501; 712/37
See application file for complete search history.

(56) References Cited

U.S. PATENT DOCUMENTS

| 5,727,208 | A | * | 3/1998 | Brown ........................... 713/100 |
| 5,778,237 | A | * | 7/1998 | Yamamoto et al. ............ 713/322 |
| 6,118,306 | A |   | 9/2000 | Orton et al. |
| 6,178,503 | B1 | * | 1/2001 | Madden et al. .................... 713/2 |
| 6,185,638 | B1 | * | 2/2001 | Beardsley et al. ............... 710/36 |
| 6,393,570 | B1 | * | 5/2002 | Henderson et al. ............ 713/310 |
| 6,457,135 | B1 |   | 9/2002 | Cooper |
| 6,615,285 | B1 | * | 9/2003 | Schafranek et al. ............... 710/3 |
| 6,718,473 | B1 | * | 4/2004 | Mirov et al. .................... 713/320 |
| 6,928,542 | B2 | * | 8/2005 | Wen et al. ......................... 713/2 |
| 7,263,457 | B2 | * | 8/2007 | White et al. .................... 702/132 |
| 7,424,601 | B2 | * | 9/2008 | Xu .................................... 713/1 |
| 7,610,380 | B2 | * | 10/2009 | Igarashi et al. ................ 709/226 |
| 7,663,446 | B1 | * | 2/2010 | Surin ............................. 331/185 |
| 7,739,536 | B2 | * | 6/2010 | Nguyen et al. ................. 713/501 |
| 7,810,152 | B2 | * | 10/2010 | Carr .................................. 726/17 |
| 2003/0097554 | A1 | * | 5/2003 | Cheston et al. .................... 713/2 |
| 2004/0193935 | A1 | * | 9/2004 | Kato et al. ...................... 713/500 |
| 2005/0076253 | A1 | * | 4/2005 | Lu .................................. 713/320 |

(Continued)

FOREIGN PATENT DOCUMENTS

CN    1739080 A    2/2006

(Continued)

OTHER PUBLICATIONS

International Search Report and Written Opinion for PCT/US2008/062462 mailed Aug. 25, 2008.

(Continued)

*Primary Examiner* — Kim Huynh
*Assistant Examiner* — Zahid Choudhury
(74) *Attorney, Agent, or Firm* — King & Spalding L.L.P.

(57) ABSTRACT

Logic circuits of a digital device may be biased to operate over specific external clock frequency ranges by programming a desired clock oscillator frequency range into a configuration memory of the digital device. In addition, clock source selection may also be programmed into the configuration register. Bias circuits are then configured so that the internal logic of the digital device will operate over the desired clock oscillator frequency range. Non-volatile memory may be used to store the contents of the configuration memory so as to retain the configuration during power down of the digital device. The non-volatile memory may be programmable fuse links, electrically erasable and programmable memory (EEPROM), FLASH memory, etc.

24 Claims, 3 Drawing Sheets

U.S. PATENT DOCUMENTS

| | | | |
|---|---|---|---|
| 2005/0093524 A1 | 5/2005 | Hsu | |
| 2005/0235176 A1* | 10/2005 | Nguyen et al. | 713/500 |
| 2005/0268133 A1* | 12/2005 | Beard | 713/323 |
| 2006/0010314 A1* | 1/2006 | Xu | 713/2 |
| 2006/0212735 A1* | 9/2006 | Allen | 713/322 |
| 2006/0259800 A1* | 11/2006 | Maejima | 713/300 |
| 2006/0282692 A1* | 12/2006 | Oh | 713/300 |
| 2007/0006007 A1* | 1/2007 | Woodbridge et al. | 713/322 |
| 2007/0234075 A1* | 10/2007 | Zimmer et al. | 713/300 |
| 2008/0209255 A1* | 8/2008 | Seguin et al. | 714/2 |

FOREIGN PATENT DOCUMENTS

| | | |
|---|---|---|
| EP | 0676687 A2 | 10/1995 |
| WO | 03027820 A2 | 4/2003 |

OTHER PUBLICATIONS

Chinese Office Action with English translation, CN application No. 200880014681.X, 8 pages, Feb. 25, 2011.

* cited by examiner

POWER OPTIMIZATION WHEN USING EXTERNAL CLOCK SOURCES

RELATED PATENT APPLICATION

This application claims priority to commonly owned U.S. Provisional Patent Application Ser. No. 60/915,713; filed May 3, 2007; entitled "Power Optimization for External Clock Sources," by Tim Phoenix, Igor Wojewoda and Pavan Kumar Bandarupalli; which is hereby incorporated by reference herein for all purposes.

TECHNICAL FIELD

The present disclosure relates to digital devices having the capability of running at different clock speeds, and more particularly, to optimization of power consumption and operation of the digital devices for a selected external clock speed.

BACKGROUND

Present technology digital devices, having digital processors, e.g., microcontrollers, microprocessors, digital signal processors (DSP), etc., and/or peripheral modules, e.g., memories, analog-to-digital converters, digital-to-analog converters, industry standard interfaces such as Ethernet, Firewire, Fibre Channel, etc., when configured to use an external clock, the digital device designs assumed that the external clock would run at a clock frequency commensurate with the fastest possible operating speed of the digital devices. Biasing of circuits in the digital devices that were dependent upon the frequency of the device operation had to assume a worst case design scenario, and thus were set to the highest power mode so as to be able to accommodate the fastest possible device operating frequency. This was wasteful for power utilization and power dissipation in the digital devices.

SUMMARY

Therefore there is a need to overcome the above-identified problems as well as other shortcomings and deficiencies of existing technologies by providing ways to configure a digital device comprising a digital processor and/or peripheral module, support logic, and configuration and clock circuits for optimal utilization of power over a wide range of external clock frequencies. According to the teachings of this disclosure, selection of operating parameters of a digital device based upon a desired frequency range of operation using an external clock source is contemplated herein. The digital device may be programmed for an external clock speed configuration that specifies the maximum external clock source frequency (speed) that will be used to operate the digital device. Once the maximum external clock speed available to the digital device is know, all affected circuits in the digital device may be optimized for best and/or most economical performance, e.g., lowest dynamic power consumption, that will allow the digital device to satisfactorily operate over the external clock frequency range (expected maximum clock speed). Programming of the digital device may be accomplished in many forms such as, for example but not limited to, programming a configuration register in the digital device, this configuration register may be volatile and/or be in combination with a non-volatile memory, e.g., saves the external clock speed configuration in the non-volatile memory, e.g., electrically erasable programmable memory (EEPROM), Flash memory, programmable fuse links, etc., According to a specific example embodiment of this disclosure, a digital device may comprise: a digital function having adjustable power and speed parameters, the adjustable power and speed parameters being selectable for operating the digital function over different clock oscillator frequency ranges; logic circuits having adjustable power and speed parameters, the adjustable power and speed parameters being selectable for operating the logic circuits over the different clock oscillator frequency ranges; and a configuration register for storing programmable configuration bits used for selecting the adjustable power and speed parameters of the digital function and logic circuits.

BRIEF DESCRIPTION OF THE DRAWINGS

A more complete understanding of the present disclosure thereof may be acquired by referring to the following description taken in conjunction with the accompanying drawings wherein.

Figure 1:
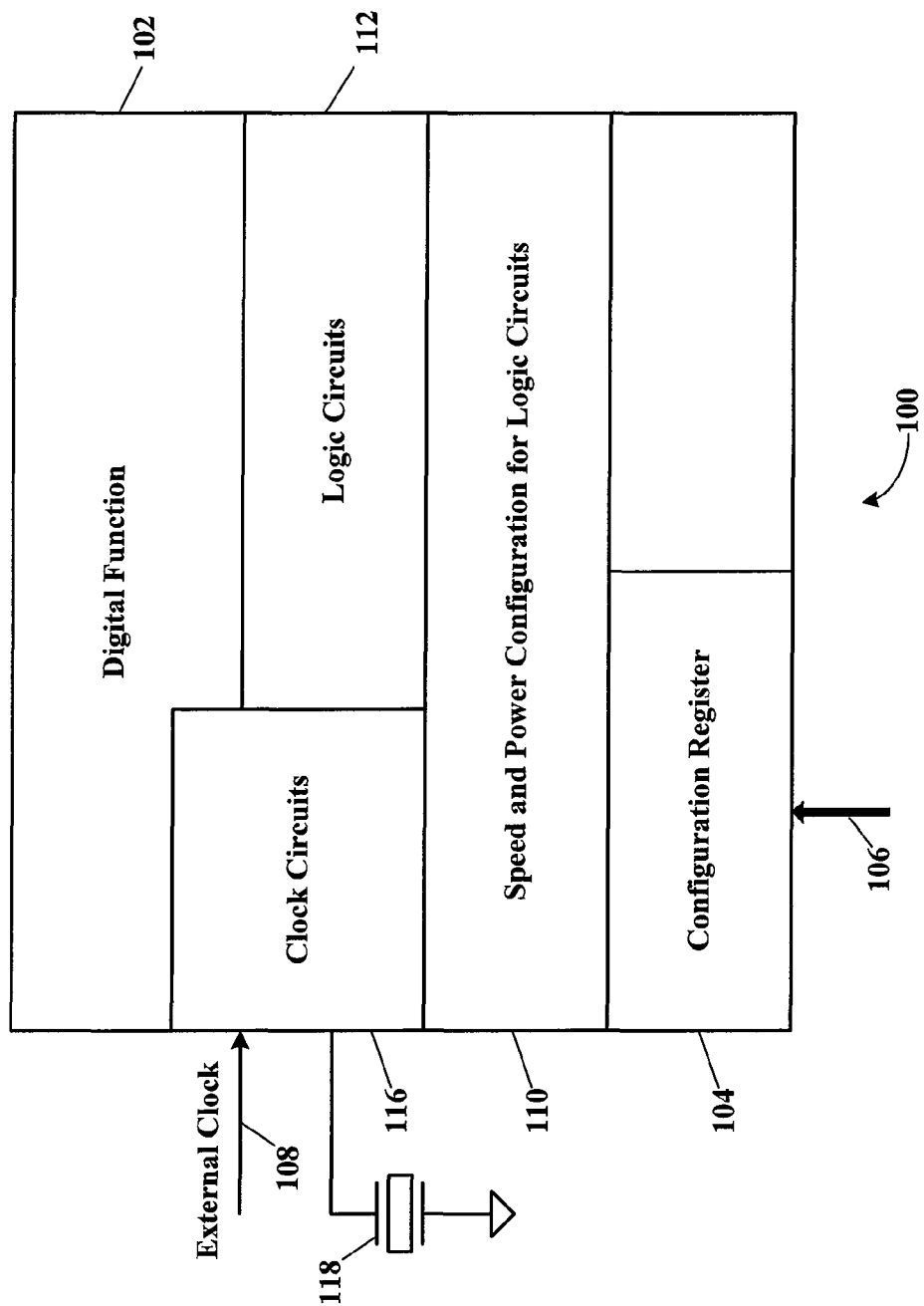
FIG. 1 illustrates a schematic block diagram of a digital device that is programmably configurable for different external clock speeds, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a digital device that is programmably configurable for different external clock speeds, according to a specific example embodiment of this disclosure. A digital device, generally represented by the numeral 100, may comprise a digital function 102, logic circuits 112, speed and power configuration circuits 110, a configuration register 104 and clock circuits 116. The clock circuits 116 may be configured to receive an external clock 108 or function as an internal oscillator with its frequency determined by an external crystal 118 or a resistor-capacitor timing circuit (not shown). The configuration register 104 may be programmed with configuration information over, for example but not limited to, a programming bus 106 that may comprise serial or parallel data. The configuration register 104 may be programmed during start-up of the device 100, at any time that the speed of the external clock 108 is about to change, and/or upon detection of a speed change of the external clock 108. Programming of the configuration register 104 may be provided from another device (not shown) and/or embedded in a start-up program, e.g., power-on-reset (POR), operating program, etc.

The digital function 102 may be a digital processor, e.g., a microcontroller, a microprocessor, a digital signal processor (DSP), application specific integrated circuit (ASIC), a programmable logic array (PLA), a field programmable gate array (FPGA) and the like, and/or a peripheral module, e.g., memory, analog-to-digital converter, digital-to-analog converter, industry standard interface(s) such as Ethernet, Firewire, Fibre Channel, etc. The speed and power configuration circuits 110 may, individually or in combination, adjust the power and/or speed of the digital function 102, logic circuits 112, random access memory sense amplifier operating speed, brown-out on reset (BOR) response speed versus power consumption, analog circuit slew rate, etc.

Figure 2:
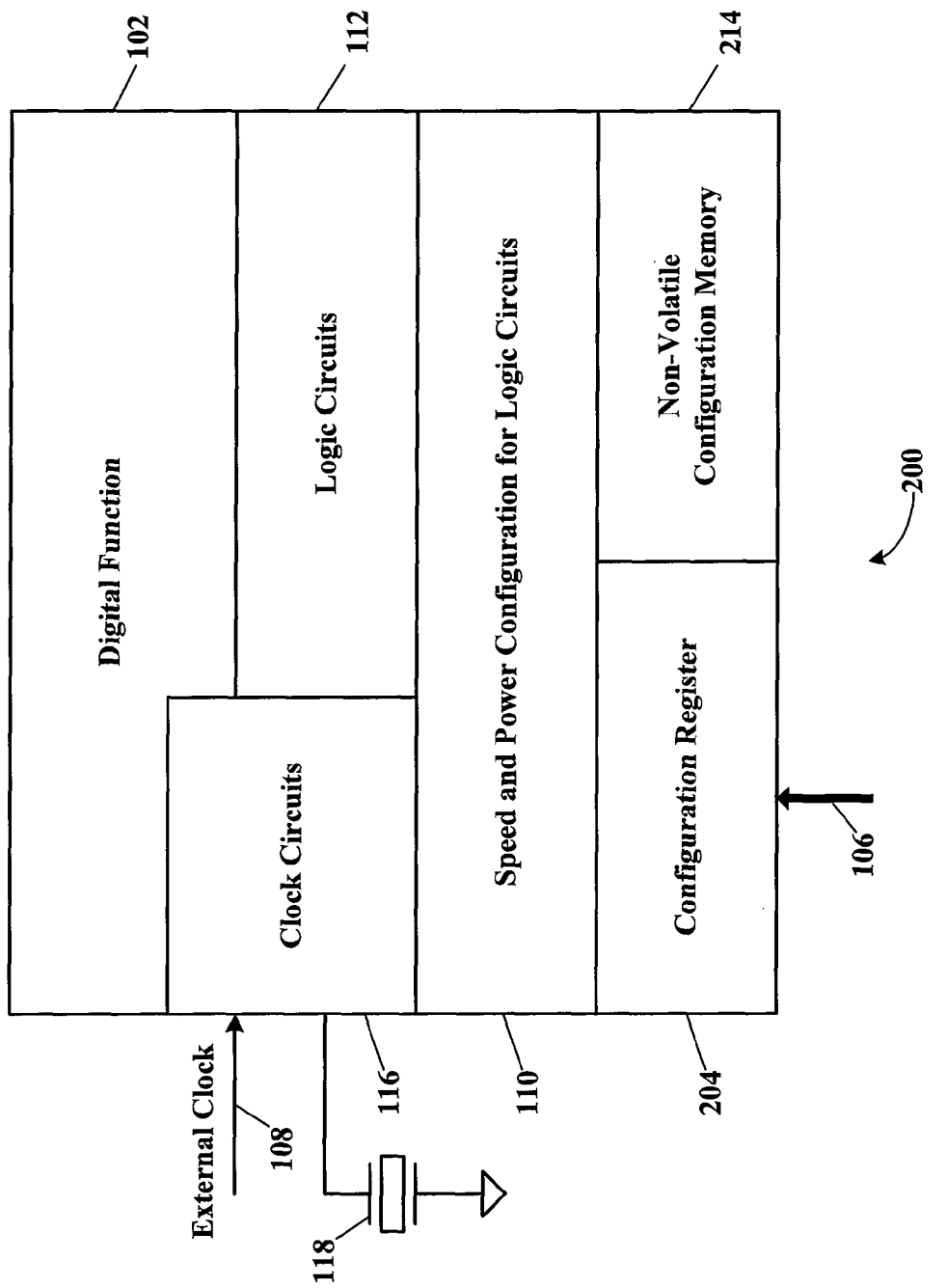
FIG. 2 illustrates a schematic block diagram of a digital device that is programmably configurable for different external clock speeds and has non-volatile memory for retaining the programmed configuration, according to another specific example embodiment of this disclosure.

Referring to FIG. 2, depicted is a schematic block diagram of a digital device that is programmably configurable for different external clock speeds and has non-volatile memory for retaining the programmed configuration, according to a specific example embodiment of this disclosure. A device with non-volatile memory, generally represented by the numeral 200, may comprise a digital function 102, logic circuits 212, speed and power configuration circuits 110, a configuration register 204, non-volatile configuration memory 214, and clock circuits 116. The clock circuits 116 may be configured to receive an external clock 108 or be an internal oscillator with its frequency determined by an external crystal 118 or a resistor-capacitor timing circuit (not shown). The configuration register 204 may be programmed with configuration information over, for example but not limited to, a programming bus 106 that may comprise serial or parallel data. The configuration register 204 may be programmed during start-up of the device 100, at any time that the speed of the external clock 108 is about to change, and/or upon detection of a speed change of the external clock 108. Programming of the configuration register 204 may be provided from another device (not shown) and/or embedded in a start-up program, e.g., power-on-reset (POR), operating program, etc. The configuration register 204 may be separate or part of the non-volatile configuration memory 214, e.g., programmable fuses, electrically erasable and programmable read only memory (EEPROM), FLASH memory, etc. Configuration information programmed into the configuration register 204 may be stored in the non-volatile configuration memory 214 and thereby retained during a power down or reset condition.

Figure 3:
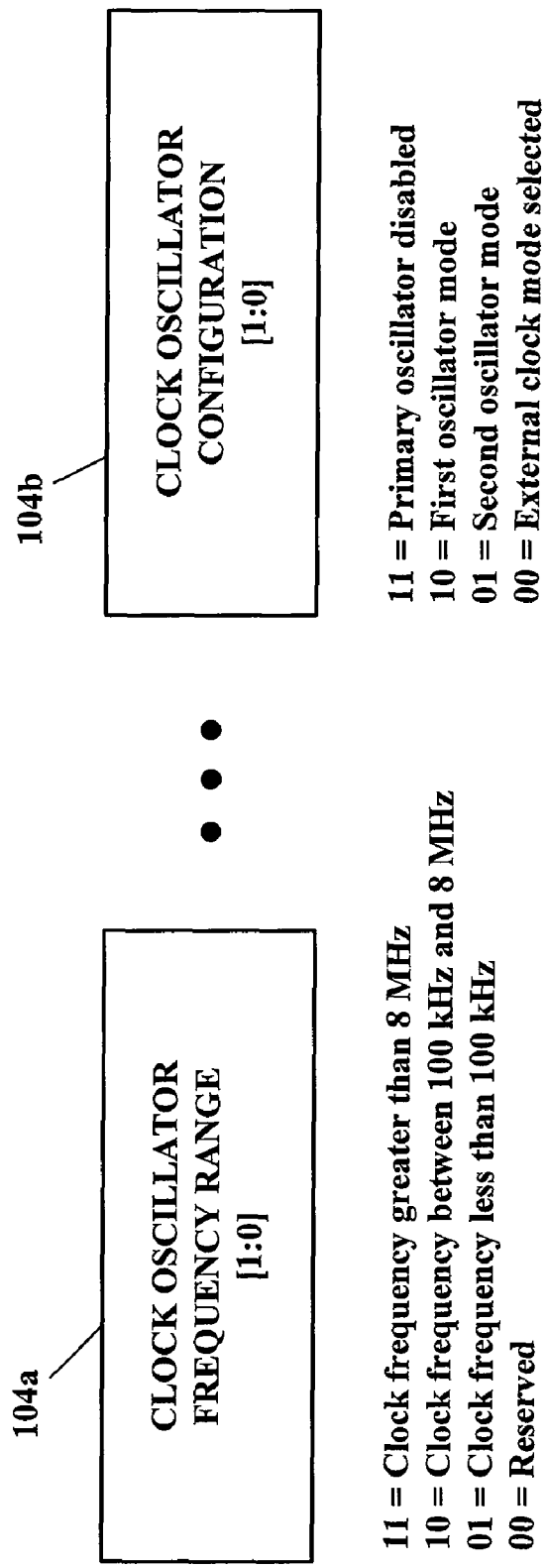
FIG. 3 illustrates a specific example embodiment of a block diagram of a configuration register that may be used in the digital devices shown FIGS. 1 and 2, and a table of some specific example speed and power configuration options, according to the teachings of this disclosure.

Referring to FIG. 3, depicted is a specific example embodiment of a block diagram of a configuration register that may be used in the digital devices shown FIGS. 1 and 2, and a table of some specific example speed and power configuration options, according to the teachings of this disclosure. Selection of the clock oscillator source may be programmed into an oscillator configuration portion 104b of the configuration register 104, and an anticipated clock oscillator frequency range of operation may be programmed into the oscillator frequency range portion 104a of the configuration register 104.

For example, the primary clock oscillator may be disabled by setting the bits to binary 11 in the oscillator configuration portion 104b of the configuration register 104. The primary clock oscillator may be in a first clock oscillator mode by setting the bits to binary 10 in the clock oscillator configuration portion 104b of the configuration register 104. The primary clock oscillator may be in a second clock oscillator mode by setting the bits to binary 01 in the clock oscillator configuration portion 104b of the configuration register 104. The primary clock oscillator may be in an external clock oscillator mode by setting the bits to binary 00 in the clock oscillator configuration portion 104b of the configuration register 104.

Configuring the frequency sensitive logic circuits 112 of the digital function 102 may be determined by the bits programmed into the clock oscillator frequency range portion 104a of the configuration register 104 as follows: For example, but not limited to, a clock frequency greater than 8 MHz may be used when the bits are set to binary 11 in the clock oscillator frequency range portion 104a of the clock configuration register 104. A clock frequency between 100 kHz and 8 MHz may be used when the bits are set to binary 10 in the clock oscillator frequency range portion 104a of the configuration register 104. A clock frequency less than 100 kHz may be used when the bits are set to binary 01 in the clock oscillator frequency range portion 104a of the configuration register 104.

Based upon the bit configuration settings of the oscillator frequency range portion 104a of the configuration register 104, the frequency dependent portions of the logic circuits 112 may be configured for the necessary bias power mode any time the digital function 102 operates from the external clock 108.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A digital device having operating parameters associated with and optimized for each one of a plurality of different clock frequency ranges, comprising:
  a digital function having a set of operating parameters optimized for each one of a plurality of different clock frequency ranges;
  logic circuits having a set of operating parameters optimized for each one of the plurality of different clock frequency ranges;
  a configuration register for programmabley selecting one of the plurality of different clock frequency ranges;
  wherein the sets of operating parameters associated with the selected one of the plurality of different clock frequency ranges are applied to operation of the digital function and the logic circuits; and
  a clock source selection bits in the configuration register, wherein the clock source selection bits determine selection of a clock source for operation of the logic circuits and digital function;
  wherein the logic circuits are coupled to an external clock selected by the clock source selection bits in the configuration register.

2. The digital device according to claim 1, wherein the configuration register is coupled to a configuration bus.

3. The digital device according to claim 2, wherein the configuration bus is a serial data bus.

4. The digital device according to claim 2, wherein the configuration bus is a parallel data bus.

5. The digital device according to claim 1, wherein a first one of the plurality of different clock frequency ranges comprise clock frequencies less than 100 kHz.

6. The digital device according to claim 1, wherein a second one of the plurality of different clock frequency ranges comprise clock frequencies between about 100 kHz to about 8 MHz.

7. The digital device according to claim 1, wherein a third one of the plurality of different clock frequency ranges comprise clock frequencies greater than about 8 MHz.

8. The digital device according to claim 1, wherein the clock source is a one of a plurality of selectable internal clocks.

9. The digital device according to claim 8, wherein the one of the plurality of selectable internal clocks uses an external crystal for frequency determination.

10. The digital device according to claim 1, wherein the clock source is an external clock.

11. The digital device according to claim 1, wherein the configuration register is reprogrammed before changing to a clock in a different clock frequency range.

12. The digital device according to claim 1, wherein the configuration register is programmed during a start-up operation.

13. The digital device according to claim 1, wherein the configuration register is programmed by an external device.

14. The digital device according to claim 1, wherein the digital function is a digital processor.

15. The digital device according to claim 14, wherein the digital processor is selected from the group consisting of a microprocessor, a microcontroller, a digital signal processor (DSP), a programmable logic array (PLA), an application specific integrated circuit (ASIC) and a field programmable gate array (FPGA).

16. The digital device according to claim 14, wherein the configuration register is programmed by the digital processor.

17. The digital device according to claim 14, wherein the digital processor programs configuration register during a start-up operation.

18. The digital device according to claim 14, wherein the digital processor programs the configuration register when a change in a clock frequency is detected.

19. The digital device according to claim 1, wherein the digital function is a peripheral function.

20. The digital device according to claim 19, wherein the peripheral function is selected from the group consisting of static random access memory, dynamic random access memory, an analog-to-digital converter, a digital-to-analog converter; and a communications interface.

21. The digital device according to claim 1, wherein the configuration register comprises a non-volatile memory.

22. The digital device according to claim 21, wherein the non-volatile memory is a plurality of programmable fuse links.

23. The digital device according to claim 21, wherein the non-volatile memory is an electrically erasable and programmable read only memory (EEPROM).

24. The digital device according to claim 21, wherein the non-volatile memory is a FLASH memory.

* * * * *